United States Patent
Zangi (10) Patent No.: US 8,064,849 B2
(45) Date of Patent: Nov. 22, 2011

(54) PRECODING FOR MULTIPLE ANNTENNAS

(75) Inventor: Kambiz Zangi, Chapel Hill, NC (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 907 days.

(21) Appl. No.: 12/027,421

(22) Filed: Feb. 7, 2008

(65) Prior Publication Data
US 2010/0081399 A1   Apr. 1, 2010

(51) Int. Cl.
H04B 1/04   (2006.01)
(52) U.S. Cl. ............ 455/103; 455/522; 455/452.2
(58) Field of Classification Search .......... 445/445–454, 445/507–526, 103, 91–92
See application file for complete search history.

(56) References Cited

U.S. PATENT DOCUMENTS

| | | | | |
|---|---|---|---|---|
| 2006/0264230 | A1* | 11/2006 | Ozluturk | 455/522 |
| 2007/0066237 | A1* | 3/2007 | Zhang et al. | 455/69 |
| 2008/0268834 | A1* | 10/2008 | Foschini et al. | 455/426.1 |
| 2008/0316935 | A1* | 12/2008 | Bala et al. | 370/252 |
| 2009/0147728 | A1* | 6/2009 | Atia et al. | 370/321 |

OTHER PUBLICATIONS

A. Tulino et al, "Capacity-Achieving Input Covariance for Single-User Multi-Antenna Channels", *IEEE Trans, on Wireless Communications*, vol. 5, No. 3, Mar. 2006, pp. 662-671.
I.E. Teletar, "Capacity of multi-antenna Gaussian channels," *Eur. Trans. Telecom*, vol. 10, pp. 585-595, Nov. 1999.
H. Weingarten et al, "The capacity region of the Gaussian Multiple-Input Multiple-Output Broadcast Channel," in *IEEE Trans. Infor. Theory*, vol. 52, Sep. 2006, pp. 3936-3964.
G. Caire et al, "On the achievable throughput in multiantenna Gaussian broadcast channel," *IEEE Trans. Infor. Theory*, vol. 49, Jul. 2003, pp. 1691-1706.
W. Yu et al, "Sum capacity of Gaussian vector broadcast channels," in *IEEE Transactions on Information Theory*, vol. 50, No. 1, Jan. 2004, pp. 145-152.
M. Karakayali et al, "Network coordination for spectrally efficient communication in cellular systems," in *IEEE Wireless Communication*, Aug. 2006, pp. 56-61.
P. Viswanath et al, "Sum capacity of the vector Gaussian broadcast channel and uplink-downlink duality," *IEEE Trans. Inform. Theory*, vol. 49, No. 8, Aug. 2003, pp. 1912-1921.
Leonid Krasny et al., "Radio Channel Models for MIMO Antenna Systems Based on Ellipsoidal Scattering," IEEE Communications Society, Globecom 2004, pp. 3969-3973.
David Tse et al., "On the Capacity of the Multiple Antenna Broadcast Channel," DIMACS Series in Discrete Mathematics and Theoretical Computer Science, 1991, pp. 1-19.

(Continued)

*Primary Examiner* — Christian Hannon
(74) *Attorney, Agent, or Firm* — Nixon & Vanderhye P.C.

(57) ABSTRACT

A wireless network (20) participates in radio frequency communication with plural wireless terminals (30). The network (20) comprises plural transmitters (40); a precoder value processor (42) configured to develop a set of precoder values; and a precoder (44) which uses the precoder values for coding the signals transmitted from the plural transmitters. The precoder value processor (42) is configured to develop a set of frequency-independent, linear precoder values for use in precoding signals transmitted from the plural transmitters (30). Each vector of the set is associated with one wireless terminal (30). The set of precoder values is determined such that a set of target average signal to interference noise (SINR) ratios is achieved by the plural wireless terminals with a predetermined total transmit power. Preferably, the predetermined total transmit power is minimum total transmit power.

8 Claims, 2 Drawing Sheets

OTHER PUBLICATIONS

M.K. Karakayali et al., "On the Maximum Common Rate Achievable in a Coordinated Network," IEEE ICC 2006 proceedings, pp. 4333-4338.

Sennur Ulukus et al., "Adaptive Power Control With MMSE Multiuser Detectors," Department of Electrical and Computer Engineering Wireless Information Networks Laboratory (WINLAB), Rutgers University, New Jersey, 1997, IEEE, pp. 361-365.

W. Yu et al., "Sum capacity of Gaussian vector broadcast channels," in *IEEE Transactions on Information Theory*, vol. 50, No. 1, Jan. 2004, pp. 145-152.

Stephen Boyd et al., "Convex Optimization," Cambridge University Press, 2009, pp. 1-730.

G.J. Foschini et al., "Coordinating multiple antenna cellular network to achieve enormous spectral efficiency," MIMO Wireless and Mobile Communications, pp. 548-555.

* cited by examiner

PRECODING FOR MULTIPLE ANNTENNAS

BACKGROUND

I. Technical Field

This invention pertains to wireless telecommunications, and particularly the use of wireless communication over channels having multiple transmit and multiple receive antennas.

II. Related Art and Other Considerations

Wireless communication over channels having multiple transmit and multiple receive antennas has generated a great deal of interest over the last decade. Multiple-input and multiple-output (MIMO) is the use of multiple antennas at both transmitter and receiver to improve communication performance. Until recently, most MIMO research was focused on serving a single user. In the single-user MIMO (SU-MIMO) case, if perfect channel state information (CSI) is available at the transmitter and receiver, one can diagonalize the channel, thereby creating as many parallel, non-interfering, sub-channels as the minimum number of transmit and receive antennas. Rather surprisingly, in the SU-MIMO case, it was later shown that the same number of parallel channels can be created between the transmitter and receiver even if only statistics of the channels are known at the transmitter (assuming some rather mild conditions on the average rank of the downlink channels). A. Tulino, A. Lozano, and S. Verdu, "Capacity-Achieving Input Covariance for Single-User Multi-Antenna Channels", *IEEE Trans, on Wireless Communications*, VOL. 5, NO. 3, March 2006; and I. E. Teletar, "Capacity of multi-antenna Gaussian channels," *Eur. Trans. Telecom*, vol. 10, pp. 585-595, November 1999.

In a non-coordinated cellular system, the transmissions in different cells are formed independently. Hence, the transmission from one cell typically acts as unwanted interference to mobiles in other cells. Since each cell acts independently, each cell has no way of knowing how its transmission will impact the mobiles in other cells. With small to medium-sized cells, other-cell interference is a main factor limiting the performance of the cellular system. Particularly for mobiles near the cell edge, the other-cell interference is a main factor prohibiting the delivery of high data rate to these users.

On the other hand, a coordinated system with distributed antennas uses its knowledge of the propagation environment to control the mutual interference by jointly shaping the signals that are transmitted to all the users.

More recently, considerable work has been done in investigating the role of multiple antenna systems in multiuser wireless networks, and especially in the broadcast (downlink) and multiple-access (uplink) scenarios. It has been shown recently that dirty-paper coding in conjunction with linear precoding is capacity achieving for the downlink Gaussian broadcast channel. See, e.g., H. Weingarten, Y. Steinberg, S. Shamai, "The capacity region of the Gaussian Multiple-Input Multiple-Output Broadcast Channel," in *IEEE Trans. Infor. Theory, vol.* 52, September 2006; G. Caire and S. Shamai, "On the achievable throughput in multiantenna Gaussian broadcast channel," *IEEE Trans. Infor. Theory*, vol. 49, July 2003; and W. Yu and 3. Cioffi, "Sum capacity of Gaussian vector broadcast channels," in *IEEE Trans. Inform. Theory*. All these results rely on the assumption that the channel between every transmitting antenna and every mobile is known perfectly at the transmitter at every frequency.

Coherent coordination schemes that have been proposed recently include the following:

Linear beamforming See, e.g., P. Viswanath and D. Tse, "Sum capacity of the vector Gaussian broadcast channel and uplink-downlink duality," *IEEE Trans. Inform. Theory*, vol. 49, no. 8, August 2003.

Linear beamforming with dirty-paper coding. See, e.g., G. Caire and S. Shamai, "On the achievable throughput in multiantenna Gaussian broadcast channel," *IEEE Trans. Infor. Theory*, vol. 49, July 2003.

Zero-forcing beamforming See, e.g., M. Karakayali, G. Foschini, and R. Valenzuela, "Network coordination for spectrally efficient communication in cellular systems," in *IEEE Wireless Communication*, August 2006.

Zero-forcing beamforming and dirty-paper coding. See, e.g., Kambiz Zangi and Dennis Hui, "Costa-Precoding and Zero-Forcing Linear Beamforming for Gaussian Broadcast Channels," *Ericsson Internal Report*, BAE-07:002519, June 2007.

There is a formidable problem with existing coherent schemes (such as those listed above, for example) for coordinating the transmissions in a system equipped with distributed antenna infrastructures. The problem is that these coherent schemes require that the channel between every transmitting antenna and every mobile be known perfectly at the transmitter. Assuming a system with t number of distributed antennas, with m number of users to be served on a given transmission timing interval (TTI), f number of subcarriers, and r number of receive antennas per user, the network must acquire the exact value of t×m×f×r channel coefficients for each TTI (e.g., very one msec). Enabling the network to acquire this information might require considerable overhead and feedback from the mobiles to the network (especially in a frequency division duplex [FDD] system).

BRIEF SUMMARY

In one of its aspects the technology concerns a wireless network which participates in radio frequency communication with plural wireless terminals. The network comprises plural transmitters; a precoder value processor configured to develop a set of precoder values; and, a precoder which uses the precoder values for coding the signals transmitted from the plural transmitters.

The precoder value processor is configured to develop a set or matrix of precoder values (e.g., frequency-independent, linear precoder values) for use in coding signals transmitted from the plural transmitters. Each precoding vector of the set is associated with one wireless terminal. The set of precoder values is determined such that a set of target average signal to interference noise (SINR) ratios is achieved by the plural wireless terminals with a predetermined total transmit power. Preferably, the predetermined total transmit power is minimum total transmit power.

In an example embodiment the precoder value processor is configured to implement an iterative procedure that comprises (1) determining a unit-norm linear precoding vector $V_i$ that maximizes the signal to interference noise ratio ($SINR_i$) for wireless terminal I; and (2) determining a minimum sum power set that satisfies the set of target average signal to interference noise (SINR) ratios. In the example embodiment, the precoder value processor is configured to evaluate the following expression to determine the unit-norm linear precoding vector $V_i$ that maximizes the signal to interference noise ratio ($SINR_i$) for wireless terminal i:

$V_i = \tilde{K}_i^{-\dagger/2} g_i^{max}$ wherein $g_i^{max}$ is a unit-norm, eigen vector associated with a maximum eigen value of a matrix $$\tilde{K}_i^{-\frac{1}{2}} K_i \tilde{K}_i^{-\frac{\dagger}{2}},$$

wherein $K_i$ is a covariance matrix $K_i = E(h_{ij} h_{ij}^\dagger)$ of each row of matrix channel $H_i$ for wireless terminal i. In the example embodiment, the precoder value processor is configured to evaluate the following expression to determine the minimum sum power set $p_{min}$ that satisfies the set of target average signal to interference noise (SINR) ratios: $p_{min} = (I - D_u A)^{-1} a$, wherein $D_u$ is a diagonal matrix defined as $D_u = \text{diag}\{a(1), a(2), \ldots a(m)\}$, wherein a is a vector whose i-th element is $$a(i) = \frac{SINR_i}{(1 + SINR_i) A(i, j)}$$

and A is an m×m matrix whose (i,j) entry is $A(i,j) = V_i^\dagger K_j V_i$, and wherein I is the identity matrix.

In another of its aspects the technology concerns a method of coding signals for transmission from a wireless network to plural wireless terminals in radio frequency communication with the network (the network comprising plural transmitters). The method comprises using a processor to develop a set of precoder values for use in precoding signals transmitted from the plural transmitters. Each precoding value is associated with one wireless terminal. The set of precoder values is determined such that a set of target average signal to interference noise (SINR) ratios is achieved essentially simultaneously by the plural wireless terminals with a predetermined total transmit power. The method further comprises using the precoder values for coding the signals transmitted from the plural transmitters.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
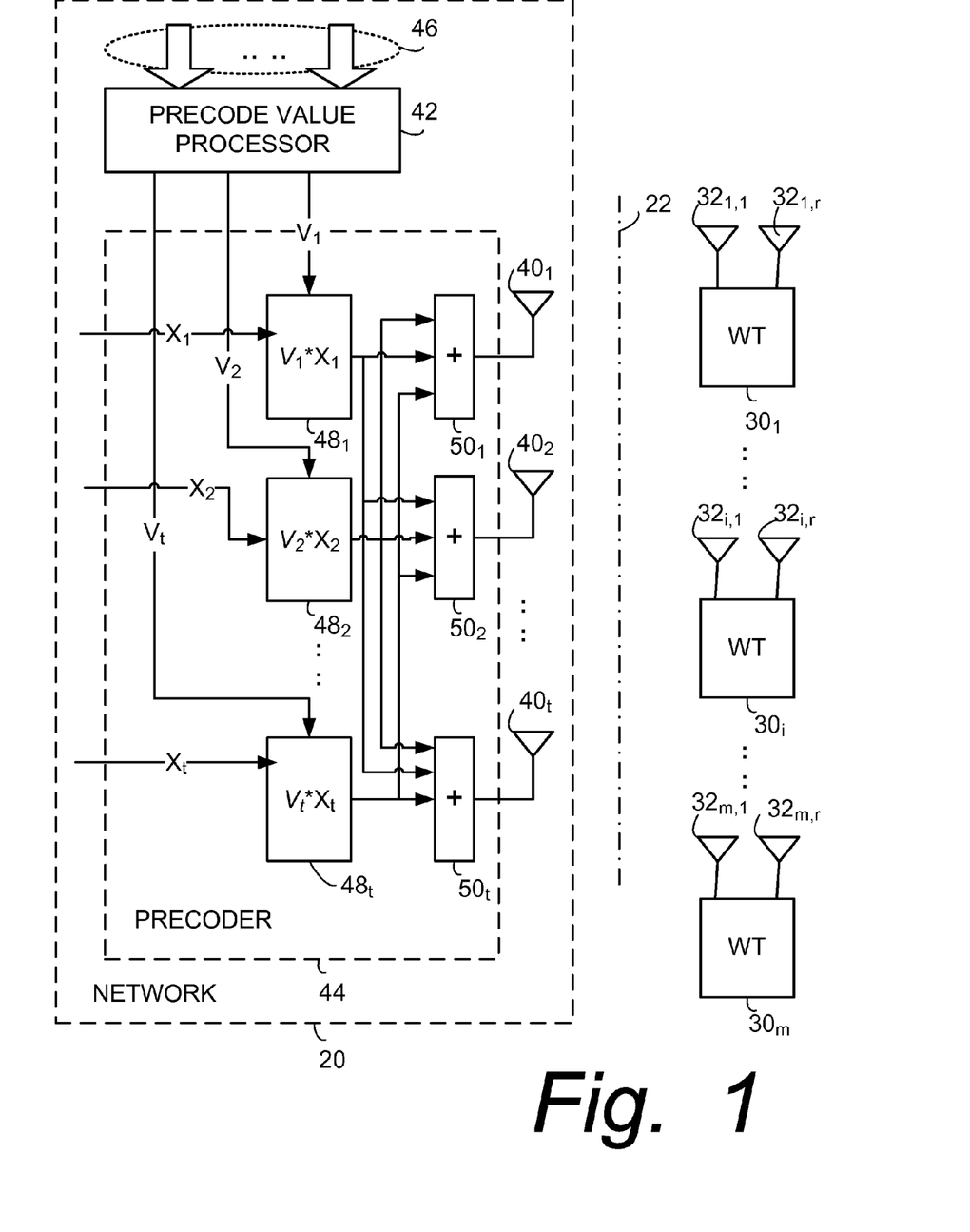
FIG. 1 is a diagrammatic view of a wireless network comprising plural transmitters for communicating with plural wireless terminals.

FIG. 1 illustrates an example wireless network 20 which participates in radio frequency communication over a radio or air interface 22 with plural wireless terminals 30, such as wireless terminals $30_1$ through $30_m$. Each of the wireless terminals 30 is shown as having plural receivers, e.g., plural antennas 32. For example, wireless terminal $30_1$ has antennas $32_{1,1}$ through $32_{1,r}$; wireless terminal $30_2$ has antennas $32_{2,1}$ through $32_{2,r}$; and so forth so that wireless terminal $30_i$ has plural antennas $32_{i,1}$ through $32_{i,r}$ and wireless terminal $30_m$ has plural antennas $32_{m,1}$ through $32_{m,r}$. While it so happens that the FIG. 1 illustration shows each of the wireless terminals 30 as having the same number (e.g., "r" number) of antennas, such need not be the case as different wireless terminals 30 can have differing numbers of antennas.

The network comprises plural transmitters 40 (e.g., transmitters $40_1$ through 40); precoder value processor 42; and, precoder 44. Each transmitter 40 comprises a transmitting antenna, and in such sense the terms "transmitter" and "antenna" are utilized interchangeably. Precoder value processor 42 is configured to develop a set of frequency-independent, linear precoder values. Precoder 44 is configured to use the precoder values developed by precoder value processor 42 for encoding the signals transmitted from the plural transmitters 40.

The precoder value processor is configured to develop a set of (e.g., frequency-independent, linear) precoder values V (e.g., $V_1 \ldots V_t$) used to encode the signals transmitted from the plural transmitters. The set of precoder values V can take the form of a linear precoding matrix, where the t-th column of V is the vector $V_t$. Each precoding vector $V_i$ is associated with one wireless terminal $30_i$. As explained herein, the set of precoder values V is determined such that a set of target average signal to interference noise (SINR) ratios is achieved (e.g., essentially simultaneously) by the plural wireless terminals with a predetermined total transmit power. Preferably, the predetermined total transmit power is minimum total transmit power.

The transmitters 40 of the wireless network 20 can be co-located at a same node of wireless network 20, or not co-located. By "not co-located" includes scenarios in which the transmitters 40 are situated at different nodes of wireless network 20 or situated at differing locations of the same node. A "node" can be, for example, the type of nodes that is referred to as a base station transceiver, a radio base station, or a NodeB (e.g., BNode).

As shown in FIG. 1, in order to develop the set of precoder values V, precoder value processor 42 receives inputs 46 as described herein. The set of precoder values V are applied to precoder 44. In particular, each precoder value $V_j$ is applied to a first input terminal of a respective multiplier 48 which comprises precoder 44. A second input terminal of each multiplier 48 receives a portion $x_j$ of an information stream x to be transmitted over the transmitters 40. The information stream is depicted as $$x = \sum_{j=1}^{m} x_j V_j.$$

Thus, for example, multiplier $48_j$ receives precoder value $V_j$ and information stream portion $x_j$, and yields the product $x_j V_j$. The products of all of the multipliers 48 are applied to adders 50, each adder 50 being associated with an associated transmitter 40 for feeding the associated transmitter 40 with the signal to be transmitted by the associated transmitter 40.

In an example embodiment, precoder value processor 42 is configured to implement an iterative procedure that comprises, for each user i, (1) determining a unit-norm linear precoding vector $V_i$ that maximizes the signal to interference noise ratio ($SINR_i$) for wireless terminal i; and (2) determining a minimum sum power set that satisfies the set of target average signal to interference noise (SINR) ratios. In so doing, precoder value processor 42 needs know statistics of the downlink channel for each wireless terminal 30, but need not know the instantaneous realization of the downlink channel (and thus eliminates the large amount of feedback and overhead which attended prior art precoding schemes).

In particular, in the example embodiment of FIG. 1, the precoder value processor 42 is configured to evaluate the following expression to determine the unit-norm linear precoding vector $V_i$ that maximizes the signal to interference noise ratio ($SINR_i$) for wireless terminal i, such unit-norm linear precoding vector $V_i$ being $V_i = \tilde{K}_i^{-1/2} g_i^{max}$ wherein $g_i^{max}$ is a unit-norm, eigen vector associated with a maximum eigen value of a matrix $$\tilde{K}_i^{-\frac{1}{2}} K_i \tilde{K}_i^{-\frac{\dagger}{2}},$$

wherein $K_i$ is a covariance matrix $K_i = E(h_{ij} h_{ij}^\dagger)$ of each row of matrix channel $H_i$ for wireless terminal i. In the example embodiment, the precoder value processor is configured to evaluate the following expression to determine the minimum sum power set $p_{min}$ that satisfies the set of target average signal to interference noise (SINR) ratios: $p_{min} = (I - D_u A)^{-1} a$, wherein $D_u$ is a diagonal matrix defined as $D_u = \text{diag}\{a(1), a(2), \ldots a(m)\}$, wherein a is a vector whose i-th element is $$a(i) = \frac{SINR_i}{(1 + SINR_i) A(i, j)}$$

and A is an m×m matrix whose (i,j) entry is $A(i,j) = V_i^\dagger K_j V_i$, and wherein I is the identify matrix.

The network 20 sends independent messages to m number of receivers. FIG. 1 assumes by way of example that the network 20 has t number of transmit antennas 40, where not all these antennas are necessarily co-located. User i, i=1, 2 . . . , m, has r number of receive antennas. It is assumed that there is an average total power constraint P at the network 20. The downlink broadcast channel (BC) is an additive noise channel and each time sample can be represented using the following expression:

$$y_i = H_i x + n_i \; i=1, 2, \ldots, m \quad (1)$$

where x is a vector of size t×1 that represents the total signal transmitted from all the transmitted antennas 40. Under the total average power constraint at the network, it is required that $E[x^\dagger x] \leq P$. In this notation, $y_i$ is the output vector, received by user i. This vector is of size r×1. $H_i$ is the matrix channel for user i whose size is r×t. The In the notation, $n_i$ is a Gaussian, circularly symmetric, complex-valued random noise vector with zero mean and normalized covariance I.

Each row of the channel matrix $H_i$ is the channel to a different antenna of user i, and $h_{ij}^\dagger$ is used to denote the j-th row of $H_i$. For now it is assumed that one stream is transmitted to each mobile, so that the total number of independent streams transmitted is m. We shall use $x_j$ to denote the symbols of the j-th transmitted stream with average power $q_j$. Associated with each transmitted stream $x_j$ is a linear preceding vector $V_j$ of size t×1, and the total transmitted signal can be expressed as the sum:

$$x = \sum_{j=1}^{m} x_j V_j \quad (2)$$

The transmitter (i.e. the network) only knows the statistics of the $H_i$, and we assume that different elements of the $H_i$ are complex, circularly symmetric, zero-mean, Gaussian random variables. We furthermore assume that different rows of each $H_i$ are independent and identically distributed, i.e. different receive antennas for each mobile i are independent and statistically identical. As shown in Expression (3), $K_i$ denotes the covariance matrix of each row of $H_i$.

$$K_i = E\{h_{ij} h_{ij}^\dagger\} \quad (3)$$

where $h_{ij}^\dagger$ is the j-th row of $H_i$. Given that different rows of $H_i$ are assumed to be statistically identical, it is seen that $K_i$ in Eq. (3) does not depend on j.

Expression (4) describes the signal that is received on the j-th antenna of the i-th user.

$$y_{ij} = h_{ij}^\dagger x + n_{ij} \quad (4)$$

$$= (h_{ij}^\dagger V_i x_i) + \underbrace{\left( h_{ij}^\dagger \sum_{j \neq i} V_j x_j + n_{ij} \right)}_{w_{ij}} \quad (5)$$

$$= (h_{ij}^\dagger V_i x_i) + w_{ij} \quad (6)$$

The term in parenthesis in Expression (6) can be considered the desired signal at the output of the j-th antenna of user i, and $w_{ij}$ can be considered noise+interference at the j-th antenna of user i. The average input SINR at the $j^{th}$ antenna of user i is defined as the ratio of the average power of these two terms, as shown in Expression (7).

$$SINR_{ij} = \frac{E\{|h_{ij}^\dagger V_i x_i|^2\}}{E\{|w_{ij}|^2\}} \quad (7)$$

The expectation in Eq. (7) is over all realization of $h_{ij}$. From Expression (7), and recalling that the different rows of $H_i$ are independent, identically distributed random vectors, it is apparent that $SINR_{ij}$ does not depend on j. Hence, from now on $SINR_i$ is used to refer to the common average input SINR at any of the antennas of mobile i. In other words, the average input SINR is the same at all the receive antennas of each mobile.

Given a set of target average SINRs (i.e., given a set $\{SINR_i\}_{i=1}^m$), and given the statistics of the downlink channels $\{K_i\}_{i=1}^m$, it is desired to find a set of $\{V_j, q_j\}_{j=1}^m$ that results in the desired set of average SINRs with minimum total transmit power $$\sum_{i=1}^m q_m.$$

More formally, we would like to find set of $\{V_j, q_j\}_{j=1}^m$ that solves the following optimization problem of Expression (8), subject to Expression (9) and Expression (10).

$$\text{Minimize} \sum_{i=1}^m q_i \quad (8)$$

$$\text{Subject to } \frac{q_i V_i^\dagger K_i V_i}{1 + \sum_{j \ne i} V_j^\dagger V_j K_i V_j q_k} = SNIR_i \ i = 1, \ldots, m \quad (9)$$

$$q_i \ge 0 \quad (10)$$
$$I = 1, \ldots, m$$

Note that $K_i$ for different sub-carriers are the same. See, e.g., L. Krasny and K. Molnar, "Radio Channel Models for MIMO Antenna Systems based on Ellipsoidal Scattering." *IEEE GLOBECOM '04.* VOL. 6, pp. 3969-3973, November 2004. Hence, only one set of $\{V_j, q_j\}_{j=1}^m$ needs to be computed for a wide-band channel with any number of sub-carriers.

Let us define an m×m matrix B whose (i,j) entry is $$B(i,j) = V_j^\dagger K_i V_j \quad (11)$$

And similarly define a vector b whose i-th element is $$b(i) = \frac{SINR_i}{(1 + SINR_i)B(i,i)} \quad i = 1, \ldots, m \quad (12)$$

From works such as P. Viswanath and D. Tse, "Sum capacity of the vector Gaussian broadcast channel and uplink-downlink duality," *IEEE Trans. Inform. Theory*, vol. 49, no. 8, August 2003; and D. Tse and P. Viswanath, "On the capacity of the multiple antenna broadcast channel" in *Multiantenna Channels: Capacity, Coding and Signal Processing*, G. J. Foschini and S. Verdu, Eds. Providence, R.I.: DIMACS, Amer. Math. Soc., it is understood that Expression (13) holds.

$$(I - \text{diag}\{b(1), b(2), \ldots, b(m)\}B)q = b \quad (13)$$

In Expression (13), the m×1 vectors q and b are defined as:

$$q = (q_1, q_2, \ldots, q_m)^T$$

$$b = (b_1, b_2, \ldots, b_m)^T \quad (14)$$

The diagonal matrix $D_d$ is defined as in Expression (15).

$$D_d = \text{diag}\{b(1), b(2), \ldots, b(m)\} \quad (15)$$

For any given set of $V_i$s, a positive solution for q in Eq. (13) exists if and only if the largest eigen value of $D_d B$ is less than one according to the Perron-Frobenius theorem. See, e.g., S. Boyd and L. Vandenberghe, *Convex Optimization*, & Cambridge University Press, 2005; and P. Viswanath and D. Tse, "Sum capacity of the vector Gaussian broadcast channel and uplink-downlink duality," *IEEE Trans. Inform. Theory*, vol. 49, no. 8, August 2003. In case that such a solution exists, the minimum sum power solution is shown by Expression (16).

$$q_{min} = (I - DB)^{-1} b \quad (16)$$

Lastly, we note that the eigen values of $D_d B$ are the solutions to the Expression (17) in $\lambda$.

$$\det(D_d B - \lambda I) = 0 \quad (17)$$

or (18)

$$\det(B - \lambda D_d^{-1}) = 0 \quad (19)$$

Solving the optimization problem of Expression (10) directly for $(V_i, q_i)$s is difficult, since each desired $SINR_i$ is affected by all other $V_j$s through the denominator of $SINR_i$. Using the well-known duality between the downlink broadcast channel (BC) and the uplink MAC (known from P. Viswanath and D. Tse, "Sum capacity of the vector Gaussian broadcast channel and uplink-downlink duality," *IEEE Trans. Inform. Theory*, vol. 49, no. 8, August 2003; and D. Tse and P. Viswanath, "On the capacity of the multiple antenna broadcast channel" in *Multiantenna Channels: Capacity, Coding and Signal Processing*, G. J. Foschini and S. Verdu, Eds. Providence, R.I.: DIMACS, Amer. Math. Soc.), we next find an uplink MAC that is dual of our downlink broadcast channel (BC). This dual uplink MAC can then be used to find an iterative algorithm for computing the solution to the optimization problem of Expression. (10).

Consider an uplink MAC where m mobiles (each with a single transmit antenna) are transmitting to a network that has t receive antennas. The i-th mobile now transmits one stream $x_i$ with average power $p_i$. Thus, the received vector at the network is as shown in Expression (20).

$$y = \sum_{i=1}^m h_i x_i + n \quad (20)$$

In Expression (20), y is the received vector of size t×1, $h_i$ is a t×1 vector channel for the i-th user on the uplink, and n is a Gaussian noise vector with covariance I. Furthermore, we assume that $h_i$ of the uplink channel is the conjugate of the first row of $H_i$, i.e. $h_i = h_{i1}^\dagger$. Lastly, we assume that all $x_i$s are independent, and we use $p_i$ to denote the average power of $x_i$.

Suppose now that a fixed linear filter $V_i^\dagger$ is used to detect $x_i$ from the received vector y as shown in Expression (21).

$$z_i = V_i^\dagger y \quad (21)$$

This is used as the decision statistics to detect in the uplink MAC. We can expand the expression in Expression. (21) as shown in Expression (22).

$$z_i = (V_i^\dagger h_i x_i) + \underbrace{\left(\sum_{j \neq i} V_i^\dagger h_j x_j + V_i^\dagger n\right)}_{w_i} \quad (22)$$

The first term in Eq. (22) is the desired signal for detecting $x_i$, and the second term, $w_i$ is the effective noise. Using the fact that $V_i$ is fixed, we can then define an average SINR for user i as the ratio of the average power of these two terms (each averaged over realization of $h_i$s) as shown by Expression (23).

$$SINR_i = \frac{p_i V_i^\dagger K_i V_i}{1 + \sum_{j \neq i} V_i^\dagger L_j V_i p_j} \quad (23)$$

Let us define an m×m matrix A whose (i, j) entry is shown by Expression (24).

$$A(i,j) = V_i^\dagger K_j V_i \quad (24)$$

Similarly, define a vector a whose i-th element is as shown in Expression (25).

$$a(i) = \frac{SINR_i}{(1 + SINR_i) A(i,i)} \quad (25)$$

It is then easy to show that Expression (26) holds.

$$(I - diag\{a(1), a(2), \ldots, a(m)\}A) p = a \quad (26)$$

In Expression (26), the m×1 vector p is defined as $$p = (p_1, p_2, \ldots, p_m)^{\dagger\dagger} \quad (27)$$

Diagonal matrix $D_u$ is defined for convenience as $$D_u = diag\{a(1), a(2), \ldots, a(m)\} \quad (28)$$

Formally, the uplink MAC problem can be stated as finding the set of $(V_j, p_j)_{j=i}^m$ that solves the constrained optimization problem of Expression (29) subject to Expressions (30) and (31).

$$\text{Minimize} \sum_{i=1}^m p_i \quad (29)$$

subject to:

$$\frac{p_i V_i^\dagger K_i V_i}{1 + \sum_{j \neq i} V_i^\dagger K_j V_i p_j} = SINR_i \quad i = 1, \ldots, m \quad (30)$$

$$p_i \geq 0 \quad i = 1, \ldots, m \quad (31)$$

For a given set of $V_i$s, using the Ferbonus-Peron theorem (described in S. Boyd and L. Vandenberghe, *Convex Optimization*, & Cambridge University Press, 2005; and P. Viswanath and D. Tse, "Sum capacity of the vector Gaussian broadcast channel and uplink-downlink duality," *IEEE Trans. Inform. Theory*, vol. 49, no. 8, August 2003) we see that a positive solution for p exists if and only if the largest eigen value of $D_u A$ is less than one. In case that a solution exists, the minimum sum power solution is shown by Expression (32).

$$p_{min} = (I - D_u A)^{-1} a \quad (32)$$

Note that the eigen values of $D_u A$ are the solutions to the following equation in $\lambda$, as shown by Expression (33) through Expression (35).

$$det(D_u A - \lambda I) = 0 \quad (33)$$

or $\quad (34)$ $$det(A - \lambda D_u^{-1}) = 0 \quad (35)$$

Comparing Expression (24) to Expression (11), we see that $A = B^t$, and we see that by setting a=b, the same set of desired $SINR_i$s is obtained in the uplink and in downlink. With a=b we also get $D_u = D_d$.

Noting that $A = B^t$ and $D_d = D_u$, it is easy to see that $(A - \lambda D_u^{-1}) = (B - \lambda D_u^{-1})^t$. Since $det(X) = det(X^t)$ for any square matrix X, we see that eigen values of $D_u A$ are the same as the eigen values of $D_d B$. This implies that for any fixed choice of $V_j$s, a positive solution to q on the downlink broadcast channel (BC) exists if a positive solution top on the uplink MAC exists. From our earlier discussion recall that in case a positive solution exists, the minimum power solution for q and p can be computed as shown by Expression (36) and Expression (37).

$$q_{min} = (I - D_d B)^{-1} b \quad (36)$$

$$p_{min} = (I - D_u B)^{-1} a \quad (37)$$

Using the fact that $A = B^t$ it is easy to show (See, e.g., S. Boyd and L. Vandenberghe, *Convex Optimization*, & Cambridge University Press, 2005; and P. Viswanath and D. Tse, "Sum capacity of the vector Gaussian broadcast channel and uplink-downlink duality," *IEEE Trans. Inform. Theory*, vol. 49, no. 8, August 2003) that sum power of $p_{min}$ and $q_{min}$ are the same, as shown by Expression (38).

$$\sum_{i=1}^m q_{min}(i) = \sum_{i=1}^m p_{min}(i) \quad (38)$$

In summary, we have shown that any set $(V_i)_{i=1}^m$ resulting in a desired set of $\{SINR_i\}_{i=1}^m$ on the downlink broadcast channel will also result in the same set of $\{SINR_i\}_{i=1}^m$ on the dual uplink MAC channel. Furthermore, the sum power of $q_{min}$ associated with $\{V_i\}_{i=1}^m$ the downlink broadcast channel is the same as the sum power of $p_{min}$ associated with $\{V_i\}_{i=1}^m$ the uplink MAC channel.

The foregoing implies that the $\{V_i\}_{i=1}^m$ that solves the optimization problem of Expression (31) for the uplink MAC channel also solves the optimization problem of Expression (10). In other words, if we can solve the dual uplink MAC problem, we can also solve the original downlink broadcast problem.

Described now is an iterative algorithm that is guaranteed to monotonically converge to the joint solution of the dual uplink MAC optimization problem (see Expression (31)) for $\{V_i, p_i\}_{i=1}^m$. This result is based on the properties of the so-called standard interference function developed originally by Ulukus and Yates for uplink power control in CDMA systems. See, e.g., S. Ulukus and R. Yates, "Adaptive Power Control with MMSE Multiuser Detectors," ICC '97.

For a given set of $\{p_i\}_{i=1}^m$, the unit-norm $V_i$ that maximizes Expression (39) and Expression (40) is now found.

$$SINR_i = \frac{p_i V_i^\dagger K_i V_i}{1 + \sum_{j \neq i} V_i^\dagger K_j V_i p_j} \quad (39)$$

$$= \frac{p_i V_i^\dagger K_i V_i}{\sum_{j \neq i} V_i^\dagger \left(\frac{1}{m+1}I + K_j p_j\right) V_i} \quad (40)$$

Let $$\tilde{K}_i = \left(\frac{1}{m+1}I + \sum_{j \neq i} K_j p_j\right),$$

and define $\tilde{K}_i^{1/2}$ as the square root of $\tilde{K}_i$ (i.e. $\tilde{K}_i = \tilde{K}_i^{1/2} (\tilde{K}_i^{1/2})^\dagger$). The $V_i$ that maximizes Expression (40) is Expression (41).~†

$$V_i = \tilde{K}_i^{-\frac{\dagger}{2}} g_i^{max} \quad (41)$$

In Expression (41), $g_i^{max}$ is the unit-norm, eigen vector associated with the maximum eigen value of the matrix of Expression (42).

$$\tilde{K}_i^{-\frac{1}{2}} K_i \tilde{K}_i^{-\frac{\dagger}{2}} \quad (42)$$

Previously we had shown that for a given set of $\{V_i\}_{i=1}^m$, the minimum sum power set of $\{p_i\}_{i=1}^m$, that meet the desired set of SINR$_i$s is given by Expression (43).

$$p_{min} = (I - D_u A)^{-1} a \quad (43)$$

Following the same reasoning as that set forth in D. Tse and P. Viswanath, "On the capacity of the multiple antenna broadcast channel" in *Multiantenna Channels. Capacity, Coding and Signal Processing*, G. J. Foschini and S. Verdu, Eds. Providence, R.I.: DIMACS, Amer. Math. Soc.; and P. Viswanath and D. Tse, "Sum capacity of the vector Gaussian broadcast channel and uplink-downlink duality," *IEEE Trans. Inform. Theory*, vol. 49, no. 8, August 2003, it is easy to see that SINR$_i$ in Expression (40) in the uplink MAC is a standard interference function (See S. Ulukus and R. Yates, "Adaptive Power Control with MMSE Multiuser Detectors," ICC '97). Hence, an iterative procedure that comprises Expression. (41) and Expression (43) is guaranteed to converge monotonically to the solution of the optimization problem for the uplink Expression (31). Let us denote the resulting solution to the optimization problem for the uplink by $\{V^*_i\}_{i=1}^m$.

As shown previously, $\{V^*_i\}_{i=1}^m$ is also the solution to the optimization problem for the downlink Expression (10). Given $\{V^*_i\}_{i=1}^m$, we can find the $q_{min}$ for the downlink according to Expression (44).

$$q_{min} = (I - DB)^{-1} b \quad (44)$$

Note that the given $\{V^*_i\}_{i=1}^m$, all the quantities right-hand-side of Expression (44) are known.

Figure 2:
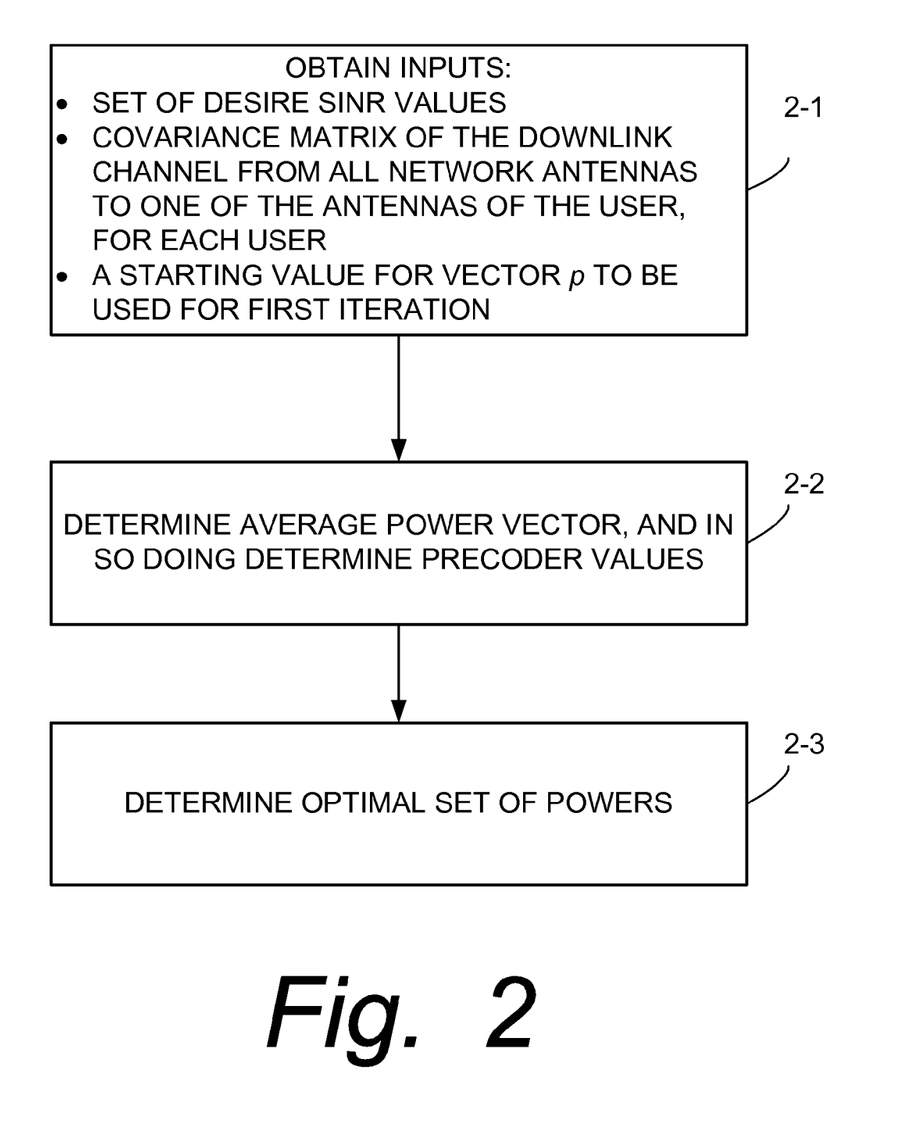
FIG. 2 is a flowchart showing example, non-limiting, basic acts or steps involved in an example embodiment of a precoder value determination procedure.

Based on the foregoing discussion, FIG. 2 illustrates example, non-limiting, basic acts or steps involved in an example embodiment of a precoder value determination procedure performed by precoder value processor 42. In performance of the precoder value determination procedure, precoder value processor 42 can be realized by a processor or controller as those terms are expansively explained herein. The precoder value determination procedure determines both a set of downlink precoding vectors $\{v_i\}_{i=1}^m$ (and the corresponding minimum powers $\{q_i\}_{i=1}^m$.

Act 2-1 of the precoder value determination procedure of FIG. 2 comprises reception or otherwise obtaining the inputs 46 useful for performing the precoder value determination procedure. There are three basic types of inputs 46 which are obtained by precoder value processor 42:

[1] A set of desired SINR values, e.g., SINR$_i$, i=1, ..., m, wherein SINR$_i$ is the desired SINR value for the i-th user. The desired SINR value for the i-th user is obtained based on the quality of service requirements of each user.

[2] For each user i, the covariance matrix of the downlink channel from all the network antennas to one of the antennas of the user i. The covariance matrix $K_i$ for user i has been previously described with respect to Expression (3). As an example, each mobile i can measure its matrix $K_i$ and transmit this measured matrix to the network using the uplink channel. Note that matrix $K_i$ is frequency independent and it changes at a much slower rate than the actual channel of the i-th mobile. Hence, transmitting this matrix from the mobile to the network will consume a small amount of resources on the uplink channel.

[3] A starting value for the vector p(0)=[1 1 ... 1]$^T$ to be used in a first iteration of the iterative precoder value determination procedure. As understood by those skilled in the art, in this nomenclature "T" stands for transpose of a matrix/vector.

Act 2-2 of the precoder value determination procedure as illustrated in FIG. 2 comprises determining the average power vector p for n=1, ... N, and as such involves iteratively evaluating Expressions (45) through (53) as set forth below for n=1, ... N. In other words, each of Expressions (45) through (53) is first evaluated for n=1, then for n=2, and so forth to some pre-determined maximum value of n=N. By the end of act 2-2, an optimal set of beamforming vectors, e.g., precoder vectors or weight vectors $\{v_i\}_{i=1}^m$, is determined. Note particularly in this regard Expression (48), which concerns the precoder vectors or weight vectors.

$$p(n-1) = [p_1(n-1), p_2(n-1), \ldots, p_m(n-1)]^T \quad (45)$$
$$i = 1, \ldots, m$$

$$\tilde{K}_i(n) = \frac{1}{m+1}I + \sum_{j \neq i} K_j p_{j(n-1)i=1,\ldots,m} \quad i = 1, \ldots, m \quad (46)$$

$$g_i(n) = eigmax \tilde{K}_i(n) K_i \tilde{K}_i^{\dagger/2}(n) \quad (47)$$

$$v_i(n) = \tilde{K}_i^{-\dagger/2} g_i(n) i = 1, \ldots, m \quad (48)$$

$$A_{ij}(n) = v_i(n)^\dagger K_j v_i(n) \quad i = 1, \ldots, m \quad j = 1, \ldots, m \quad (49)$$

$$a_i(n) = \frac{SINR_i}{(1 + SINR_i) A_{ii}(n)} \quad i = 1, \ldots, m \quad (50)$$

$$a(n) = [a_1(n) a_2(n) \ldots a_m(n)]^T \quad (51)$$

$$D_u(n) = diag\{a_1(n), a_2(n), \ldots, a_m(n)\} \quad (52)$$

$$p(n) = (I - D_u(n) A(n))^{-1} a(n) \quad (53)$$

Thus, after having performed Expression (53) for n=N, the optimal set of beamforming vectors, e.g., precoder vectors or weight vectors $\{v_i\}_{i=1}^m$, is determined. Then, as act 2-3, the precoder value determination procedure determines the optimal set of powers $\{q_i\}_{i=1}^m$, which is also known as the minimum sum power set $p_{min}$ that satisfies the set of target average signal to interference noise (SINR) ratios. Act 2-3 comprises performing/evaluating Expression (54) through Expression (58) as set forth below.

$$B_{ij} = v_i(N)^\dagger K_i v_j(N) \quad i = 1, \ldots, m \quad j = 1, \ldots m \quad (54)$$

$$b_i = \frac{SINR_i}{(1 + SINR_i)B_{ii}} \quad i = 1, \ldots, m \quad (55)$$

$$b = [b_1, b_2 \ldots, b_m]^T \quad (56)$$

$$D_d = \text{diag}\{b_1, , b_2 \ldots, b_m\} \quad (57)$$

$$q = (I - D_d B)^{-1} b \quad (58)$$

After the example precoder value determination procedure of FIG. 2 has been performed by precoder value processor 42, the optimal set of beamforming vectors, e.g., precoder vectors or weight vectors $\{v_i\}_{i=1}^m$, are applied to the respective multipliers 48 and utilized to code the signals x which are to be transmitted from the respective plural transmitters 40.

An advantage of the coordination schemes disclosed herein is that they require a lot less feedback/overhead compared to the existing coherent coordination schemes.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A node configured to interact with a wireless network which participates in radio frequency communication with plural wireless terminals, the wireless network including plural transmitters, the node comprising:
   a precoder value processor configured to develop a set of frequency-independent, linear precoder values, the set including a vector for each associated wireless terminal, the set being determined such that a plurality of target average signal to interference noise (SINR) ratios is achieved essentially simultaneously by the plural wireless terminals with a predetermined total transmit power; and
   a precoder configured to code signals based at least in part on the linear precoder values, the signals that are to be transmitted by the plural transmitters,
   wherein the precoder value processor is configured to implement an iterative process that is further configured to:
      1) determine a unit-norm linear precoding vector $V_i$, that maximizes the signal to interference noise ratio ($SINR_i$) for wireless terminal i; and
      2) determine a minimum sum power set that satisfies the set of target average signal to interference noise (SINR) ratios.

2. The node of claim 1, wherein the precoder value processor is configured to evaluate the following expression to determine the unit-norm linear precoding vector $V_i$, that maximizes the signal to interference noise ratio ($SINR_i$) for wireless terminal i:

$$V_i = \tilde{K}_i^{-\dagger/2} g_i^{max}$$

wherein $g_i^{max}$ is a unit-norm, eigen vector associated with a maximum eigen value of a matrix $$\tilde{K}_i^{-\frac{1}{2}} K_i \tilde{K}_i^{-\frac{\dagger}{2}},$$

wherein $K_i$ is a covariance matrix $K_i = E(h_{ij} h_{ij}^\dagger)$ of each row of matrix channel $H_i$ for wireless terminal i.

3. The node of claim 1, wherein the precoder value processor is configured to evaluate the following expression to determine the minimum sum power set $p_{min}$ that satisfies the set of target average signal to interference noise (SINR) ratios:

$$p_{min} = (I - D_u A)^{-1} a$$

wherein $D_u$ is a diagonal matrix defined as $D_u = \text{diag}\{a(1), a(2), \ldots a(m)\}$, wherein a is a vector whose i-th element is $$a(i) = \frac{SINR_i}{(1 + SINR_i)A(i, j)}$$

and A is an m×m matrix whose (i,j) entry is $A(i,j) = V_i^t K_j V_i$, and wherein I is an identity matrix.

4. A method of coding signals for transmission from a wireless network to plural wireless terminals that are in radio frequency communication with the network, the network comprising plural transmitters, the network including at least one processor, the method comprising:
   generating a set of precoder values on the at least one processor, the set including a vector for each associated wireless terminal of the plural wireless terminals, the set of precoder values being determined such that a set of target average signal to interference noise (SINR) ratios is achieved by the plural wireless terminals with a predetermined total transmit power;
   coding signals that are to be transmitted from the plural transmitters to the plural wireless terminals based on the generated set of precoder values;

determining the precoder values using an iterative procedure that comprises:
1) determining a unit-norm linear precoding vector $V_i$ that maximizes the signal to interference noise ratio (SINR$_i$) for wireless terminal i; and
2) determining a minimum sum power set that satisfies the set of target average signal to interference noise (SINR) ratios.

5. The method of claim 4, further comprising evaluating the following expression to determine the unit-norm linear precoding vector $V_i$ that maximizes the signal to interference noise ratio (SINR$_i$) for wireless terminal i:

$$V_i = \tilde{K}_i^{-\dagger/2} g_i^{max}$$

wherein $g_i^{max}$ is a unit-norm, eigen vector associated with a maximum eigen value of a matrix $$\tilde{K}_i^{-\frac{1}{2}} K_i \tilde{K}_i^{-\frac{\dagger}{2}},$$

wherein $K_i$ is a covariance matrix $K_i = E(h_{ij} h_{ij}^\dagger)$ of each row of matrix channel $H_i$ for wireless terminal i.

6. The method of claim 4, further comprising evaluating the following expression to determine the minimum sum power set $p_{min}$ that satisfies the set of target average signal to interference noise (SINR) ratios:

$$p_{min} = (I - D_u A)^{-1} a$$

wherein $D_u$ is a diagonal matrix defined as $D_u = \text{diag}\{a(1), a(2), \ldots a(m)\}$, wherein a is a vector whose i-th element is $$a(i) = \frac{SINR_i}{(1 + SINR_i) A(i, j)}$$

and A is an m×m matrix whose (i,j) entry is $A(i,j) = V_i^T K_j V_i$, and wherein I is an identity matrix.

7. A node configured to communicate with a wireless network which participates in radio frequency communication through plural transmitters with plural wireless terminals, the node comprising:
a processing system configured to:
determine a plurality of target average signal to interference noise ratios (SINR);
calculate a plurality of frequency-independent, linear precoder values, the calculation constrained by the plurality of target average SINRs and a predetermined total transmit power,
wherein the wireless network includes a precoder that is configured to code signals that are to be transmitted by the plural transmitters based at least in part on the linear precoder values,
the set of frequency-independent, linear precoder values includes at least one vector for each one of the plural wireless terminals, and
the plurality of target average signal SINRs is determined substantially simultaneously with the calculated plurality of frequency-independent, linear precoder values,
wherein the processing system is further configured to evaluate the following expression to determine a unit-norm linear precoding vector $V_i$ that maximizes the signal to interference noise ratio (SINR$_i$) for wireless terminal i:

$$V_i = \tilde{K}_i^{-\dagger/2} g_i^{max}$$

wherein $g_i^{max}$ is a unit-norm, eigen vector associated with a maximum eigen value of a matrix $$\tilde{K}_i^{-\frac{1}{2}} K_i \tilde{K}_i^{-\frac{\dagger}{2}},$$

wherein $K_i$ is a covariance matrix $K_i = E(h_{ij} h_{ij}^\dagger)$ of each row of matrix channel $H_i$ for wireless terminal i.

8. The node of claim 7, wherein the precoder value processor is configured to evaluate the following expression to determine a minimum sum power set $p_{min}$ that satisfies the set of target average signal to interference noise (SINR) ratios:

$$p_{min} = (I - D_u A)^{-1} a$$

wherein $D_u$ is a diagonal matrix defined as $D_u = \text{diag}\{a(1), a(2), \ldots a(m)\}$, wherein a is a vector whose i-th element is $$a(i) = \frac{SINR_i}{(1 + SINR_i) A(i, j)}$$

and A is an m×m matrix whose (i,j) entry is $A(i,j) = V_i^T K_j V_i$, and wherein I is an identity matrix.

* * * * *

UNITED STATES PATENT AND TRADEMARK OFFICE
CERTIFICATE OF CORRECTION

| | | |
|---|---|---|
| PATENT NO. | : 8,064,849 B2 | Page 1 of 1 |
| APPLICATION NO. | : 12/027421 | |
| DATED | : November 22, 2011 | |
| INVENTOR(S) | : Zangi | |

It is certified that error appears in the above-identified patent and that said Letters Patent is hereby corrected as shown below:

On the Face Page, in Field (54), in Title, in Column 1, Line 1, delete "ANNTENNAS" and insert -- ANTENNAS --, therefor.

In Column 1, Line 1, delete "ANNTENNAS" and insert -- ANTENNAS --, therefor.

In Column 4, Line 49, delete "40);" and insert -- $40_t$); --, therefor.

In Column 6, Line 23, delete "H," and insert -- $H_i$ --, therefor.

In Column 11, Line 21, delete "$(\mathbb{K}_i^{1/2})^\dagger)$. The $V_i$" and insert -- $(\tilde{K}_i^{1/2})^\dagger)$. The $V_i$ --, therefor.

In Column 11, Line 44, delete "Channels." and insert -- Channels: --, therefor.

In Column 12, Line 14, delete "SINR," and insert -- SINRi --, therefor.

In Column 14, Line 10, in Claim 1, delete "$V_i$," and insert -- $V_i$ --, therefor.

In Column 14, Line 18, in Claim 2, delete "$V_i$," and insert -- $V_i$ --, therefor.

In Column 15, Line 25, in Claim 5, delete "$K_i$," and insert -- $K_i$ --, therefor.

Signed and Sealed this
Twentieth Day of March, 2012

David J. Kappos
*Director of the United States Patent and Trademark Office*